United States Patent
Saleh et al.

(10) Patent No.: US 10,235,823 B1
(45) Date of Patent: Mar. 19, 2019

(54) PASSIVE ENTRY SYSTEM OF A VEHICLE HAVING RELAY ATTACK PREVENTION

(71) Applicants: Ahmad N Saleh, Rochester Hills, MI (US); Donald W Grimaudo, Rochester Hills, MI (US); Jerry M Nasiadka, Rochester Hills, MI (US)

(72) Inventors: Ahmad N Saleh, Rochester Hills, MI (US); Donald W Grimaudo, Rochester Hills, MI (US); Jerry M Nasiadka, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/878,908

(22) Filed: Jan. 24, 2018

(51) Int. Cl.
- *G07C 9/00* (2006.01)
- *H04B 17/24* (2015.01)
- *H04B 17/27* (2015.01)

(52) U.S. Cl.
CPC ......... *G07C 9/00309* (2013.01); *H04B 17/24* (2015.01); *H04B 17/27* (2015.01); *G07C 2009/00547* (2013.01); *G07C 2009/00555* (2013.01); *G07C 2009/00793* (2013.01); *G07C 2009/00984* (2013.01)

(58) Field of Classification Search
CPC ...... G07C 9/00309; G07C 2009/00793; G07C 9/00182; G07C 2209/63; G07C 9/00944; G07C 2209/64; G07C 9/00111; G07C 2209/65; G07C 9/00126
USPC ....................................... 340/5.72
See application file for complete search history.

(56) References Cited

U.S. PATENT DOCUMENTS

| | | | |
|---|---|---|---|
| 6,906,612 B2 | 6/2005 | Ghabra et al. | |
| 7,791,457 B2 | 9/2010 | Ghabra et al. | |
| 9,666,005 B2* | 5/2017 | Ellis | G07C 9/00309 |
| 9,736,639 B2* | 8/2017 | Saari | H04W 4/023 |
| 9,747,736 B2* | 8/2017 | Austen | G07C 9/00309 |
| 9,767,655 B2* | 9/2017 | Yang | G08B 21/24 |
| 9,892,293 B1* | 2/2018 | Wade | G06K 7/10277 |
| 9,894,613 B2* | 2/2018 | Scheim | H04W 52/0245 |
| 10,002,535 B1* | 6/2018 | Hille | B60Q 5/006 |
| 10,091,633 B2* | 10/2018 | Ghabra | H04W 8/005 |
| 2003/0222757 A1 | 12/2003 | Ghabra et al. | |
| 2010/0321154 A1 | 12/2010 | Ghabra et al. | |
| 2015/0074805 A1 | 3/2015 | Choi et al. | |

* cited by examiner

*Primary Examiner* — Mark S Blouin
(74) *Attorney, Agent, or Firm* — Ralph E. Smith

(57) ABSTRACT

A passive entry system of a vehicle includes relay attack prevention. The passive entry system includes a control module in the vehicle, at least one antenna at the vehicle and a key fob. A predetermined number of signals are transmitted via the at least one antenna with each signal having a different power strength. The key fob is determines a power strength of each signal that the key fob receives and generates a measurement report to transmit to the control module. The control module is configured to determine whether the measurement report contains received signal strength indicators for at least half of the predetermined number of signals and whether the received signal strength indicator for each signal contained in the measurement report correlates to the power strength of that signal as transmitted by the at least one antenna.

15 Claims, 3 Drawing Sheets

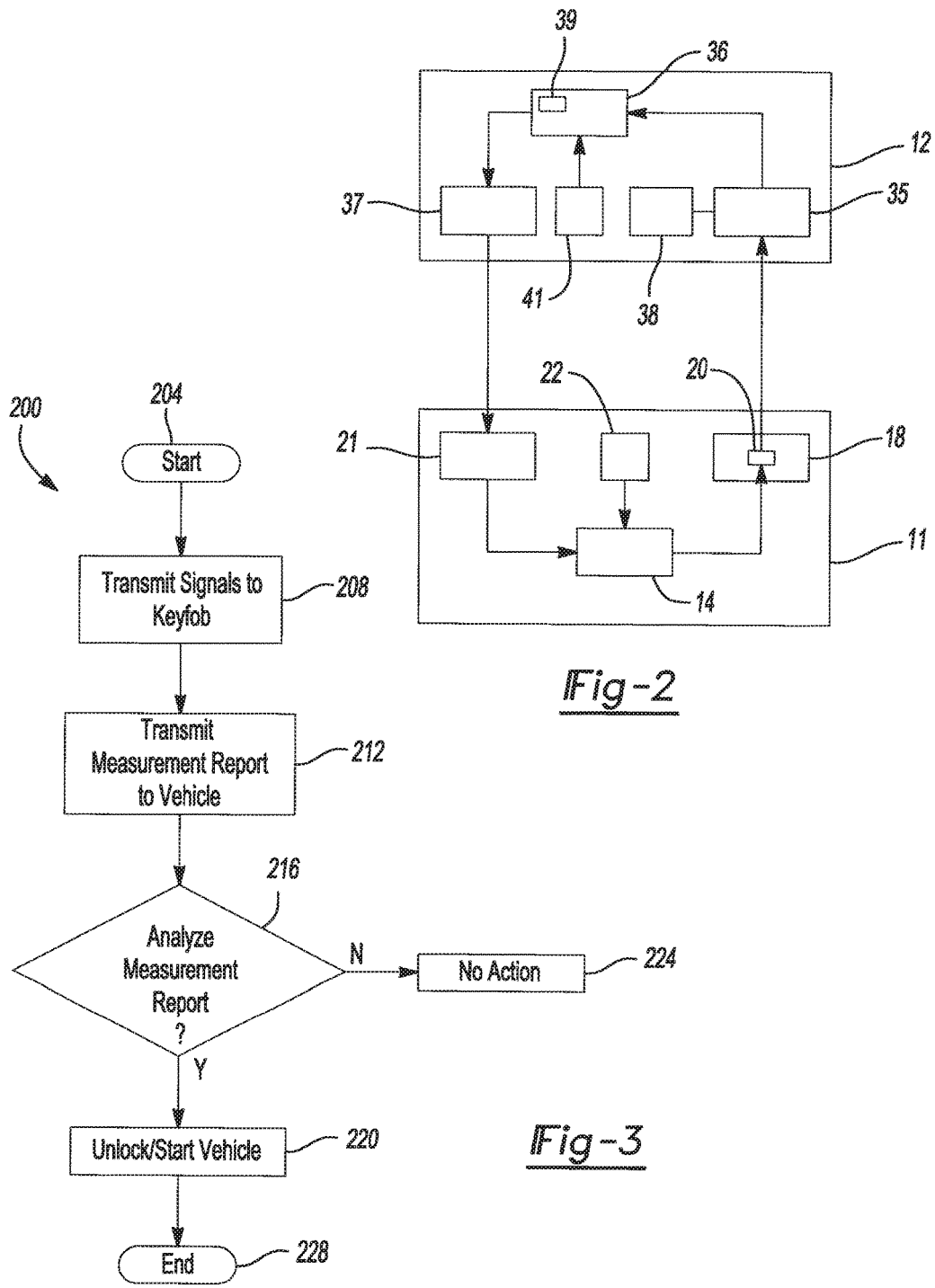

PASSIVE ENTRY SYSTEM OF A VEHICLE HAVING RELAY ATTACK PREVENTION

FIELD

The present disclosure relates to preventing a relay attack of a passive entry system of a vehicle and a passive entry system of a vehicle having relay attack prevention.

BACKGROUND

This section provides background information relates to the present disclosure and is not necessarily prior art.

Some vehicles include passive entry systems that allow a user to unlock the vehicle from a key fob that is located a distance away from the vehicle. The vehicle transmits a signal to the key fob located a distance (e.g., 3 meters) away upon a vehicle triggering event (e.g., touching a handle of the vehicle, pulling the handle of the vehicle, or pushing a start button of the vehicle). The key fob transmits the signal and the key fob's identification back to the vehicle. If the vehicle recognizes the signal and the key fob's identification as belonging to the vehicle, and the key fob is at an exterior of the vehicle, the vehicle is unlocked. Similarly, if the vehicle recognizes the signal and the key fob's identification as belonging to the vehicle, and the key fob is at an interior of the vehicle, the vehicle is started.

These passive entry systems are susceptible to relay attacks wherein thieves extend the range (e.g., 1 km) of communication between the vehicle and the key fob. One thief is located at the vehicle with one relay attack device to communicate with the vehicle. Another thief is located a distance away from the vehicle with another relay attack device to communicate with the key fob. The one thief performs the vehicle triggering event and intercepts the signal transmitted from the vehicle using the one relay attack device. The one relay attack device transmits the intercepted signal to the other relay attack device, which transmits the intercepted signal to the key fob. The key fob receiving the intercepted signal from the other relay attack device transmits the signal and the key fob's identification back to the vehicle, thereby causing the vehicle to unlock or start. The teachings of the present disclosure provide a passive entry system that prevents thieves from using the signal transmitted from the vehicle to unlock or start the vehicle.

SUMMARY

This section provides a general summary of the disclosure, and is not a comprehensive disclosure of its full scope or all of its features.

In accordance with some configurations of the present disclosure, a passive entry system of a vehicle has relay attack prevention, and a method of preventing relay attack against the passive entry system is provided. The passive entry system includes a control module, at least one antenna and a key fob. The control module is disposed in the vehicle and the at least one antenna is disposed at the vehicle. The at least one antenna is in communication with the control module and a predetermined number of signals are transmitted from the antenna upon a key trigger event. Each signal of the predetermined number of signals has a different power level. The key fob determines a power strength of each of the predetermined number of signals that the key fob receives and generates a measurement report having a received signal strength indicator for each received signal that indicates the determined power strength of that received signal and the key fob transmits the measurement report to the control module. The control module determines whether the measurement report contains received signal strength indicators for at least half of the predetermined number of signals transmitted from the at least one antenna and whether the received signal strength indicator for each signal of the predetermined number of signals contained in the measurement report correlates to the power strength of that signal as transmitted by the at least one antenna. The control module performs a key operation upon determining that the received measurement report contains received signal strength indicators for at least half of the predetermined number of signals transmitted from the at least one antenna and that the received signal strength indicator for each signal contained in the measurement report correlates to the power strength of that signal as transmitted by the at least one antenna.

In some configurations, the power strength of each signal of the predetermined number of signals is a fraction of a predefined constant.

In some configurations, the key fob utilizes each of the signals of the predetermined number of signals transmitted from the at least one antenna that are received by the key fob within a specified scanning time in generating the measurement report.

In some configurations, the control module determines whether the key fob is located outside of the vehicle and within a predefined exterior zone or inside the vehicle and within a predefined interior zone, and upon determining that the key fob is outside the vehicle and within the predefined exterior zone, the control module performs the key operation by unlocking a door of the vehicle and upon determining that the key fob is inside the vehicle and within the predefined interior zone, the control module performs the key operation by starting the vehicle.

In some configurations, key fob location coordinates are transmitted to the control module, and the control module calculates a distance the key fob is relative to the vehicle using the key fob location coordinates and vehicle location coordinates.

In some configurations, the control module determines whether the key fob is located outside of the vehicle and within a predefined exterior zone based on the measurement report and the distance calculated using the vehicle and the key fob location coordinates, and upon determining that the key fob is outside the vehicle and within the predefined exterior zone based on the measurement report and the distance calculated using the vehicle and the key fob location coordinates, the control module performs a key operation by unlocking a door of the vehicle.

In some configurations, the control module determines whether the key fob is located inside of the vehicle and within a predefined interior zone based on the measurement report and the distance calculated using the vehicle and the key fob location coordinates, and upon determining that the key fob is inside the vehicle and within the predefined interior zone based on the measurement report and the distance calculated using the vehicle and the key fob location coordinates, the control module performs a key operation by starting the vehicle.

In some configurations, the predetermined number of signals are arbitrarily transmitted from the at least one antenna to the key fob.

Further areas of applicability of the teachings of the present disclosure will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not of all possible implementations, and are not intended to limit the scope of the present disclosure.

FIG. 2 is a block diagram of the system of FIG. 1;

FIG. 3 is a flowchart of a control sequence of the system of FIG. 1; and

Corresponding reference numerals indicate corresponding parts throughout the several views of the drawings.

DETAILED DESCRIPTION

Example embodiments will now be described more fully with reference to the accompanying drawings.

Figure 1:
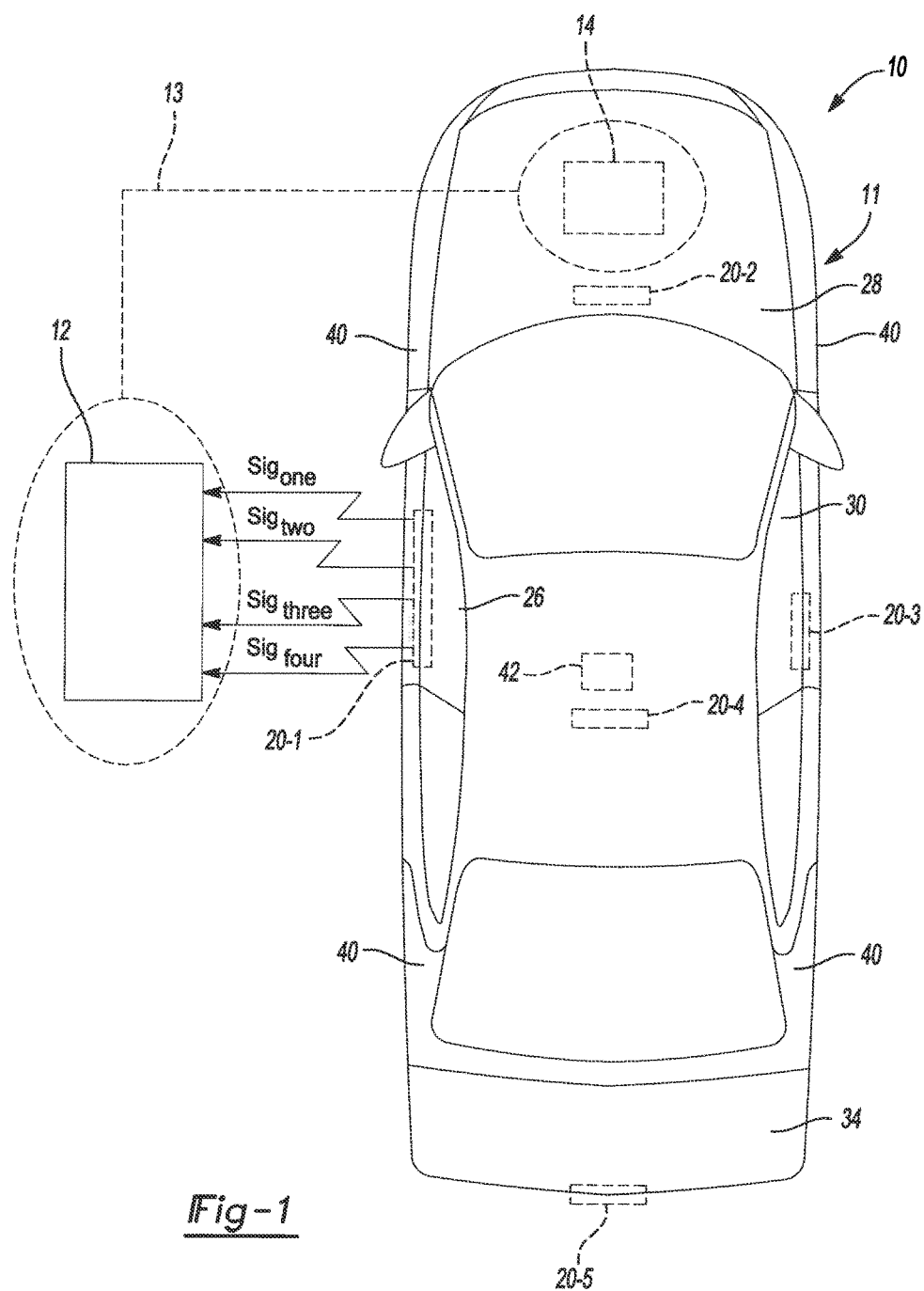
FIG. 1 is a system for preventing relay attacks according to the principles of the present disclosure.

With reference to FIGS. 1 and 2, a system 10 is provided for thwarting or preventing a relay attack including a vehicle 11 having a passive entry system 13 that includes a key fob 12 in communication with the vehicle 11, a control module 14 (e.g., a radio frequency hub module (RFHM)), an LF transceiver system 18 having one or more low frequency (LF) antennas 20 (such as LF antennas 20-1, 20-2, 20-3, 20-4, 20-5) individually a LF antenna 20 and collectively a plurality of LF antennas 20, a UHF transceiver system 21, and a positioning module 22. The control module 14 is disposed within the vehicle 11 and is configured to perform a key operation in response to a command from the key fob 12. The LF antennas 20 are disposed at various locations of the vehicle 11 and the UHF transceiver system 21 is disposed within vehicle 11. A key operation is any operation to trigger a function that would ordinarily be performed by a key such as unlocking or locking doors 26, 30 of the vehicle 11, opening a trunk 34 of the vehicle 11, or starting the vehicle 11. The control module 14 also communicates with the plurality of LF antennas 20 disposed at various locations of the vehicle 11.

The positioning module 22 is configured to obtain location coordinates (longitudinal and latitudinal coordinates) of the vehicle 11 such as via a global position system. The positioning module 22 of the vehicle 11 transmits these location coordinates to the control module 14. The global position system can be the Global Position System (GPS), the Galileo Position System, the Beidou Navigation Satellite System (BDS) or the Global Navigation Satellite System (GLONASS), for example.

As shown in FIG. 1, the LF antennas 20-1, 20-2, 20-3, 20-4, 20-5 can be disposed at the front driver side door 26, a vehicle front panel 28, the front passenger side door 30, a center floor area, and the trunk compartment 34, respectively. As shown in FIG. 2, when a key trigger event occurs (e.g., pulling a handle of door 26, touching the handle 26, or pushing a start button of vehicle 11), the control module 14 communicates to the LF transceiver system 18 such that at least one LF antenna 20-1, 20-2, 20-3, 20-4, 20-5 transmits a predetermined number of signals to the key fob 12. Each signal of the predetermined number of signals has a different power strength which is a fraction of a predefined constant of X (where X is a low frequency (LF) signal power strength targeted to reach a predefined distance (e.g., 3 meters)).

For example, as shown in FIG. 1, the LF antenna 20-1 disposed at the front driver side door 26 of the vehicle 11 transmits four signals $SIG_{one}$, $SIG_{two}$, $Sig_{three}$, $SIG_{four}$ to the key fob 12 when a driver (not shown), for example, touches the handle (not shown) of the door 26. At the predefined constant of X, each signal $SIG_{one}$, $SIG_{two}$, $Sig_{three}$, $SIG_{four}$ would have a power strength of the following: $SIG_{one,power}$=X, $SIG_{two,power}$=X/2 $Sig_{three,power}$=X/3, and $SIG_{four,power}$=X/4. The four signals $SIG_{one}$, $SIG_{two}$, $Sig_{three}$, $SIG_{four}$ can be arbitrarily transmitted (e.g., $SIG_{two}$, $SIG_{four}$, $SIG_{one}$, $Sig_{three}$) to the key fob 12 when the driver, for example, touches the handle of the door 26. This provides the benefit of preventing a relay attack of the vehicle 11 in the event that thieves realize the order and the power levels of the four signals $SIG_{one}$, $SIG_{two}$, $Sig_{three}$, $SIG_{four}$.

Although the predetermined number of signals transmitted from the LF antenna 20-1 to the key fob 12 is shown in FIG. 1 as four, the predetermined number of signals transmitted can be infinite (e.g., $SIG_{one}$, $SIG_{two}$, . . . , $Sig_{(n)}$). It should be also understood that the predetermined number of signals can be transmitted to the key fob 12 from antennas 20-2, 20-3, 20-4, 20-5, in addition to, or instead of, the antenna 20-1 when the driver, for example, touches the handle of the door 26.

As shown in FIG. 2, the key fob 12 includes an LF transceiver system 35, a control module 36, a UHF transceiver system 37, a positioning module 41 and a timing module 38. The LF transceiver system 35 is configured to receive the predetermined number of signals from the at least one LF antenna 20 and provide the predetermined number of signals to the control module 36 such that the strengths can be measured using a Received Signal Strength Indicator (RSSI) 39. The control module 36 generates a measurement report, which includes the predetermined number of signals received by the LF transceiver system 35. The UHF transceiver system 37 is configured to receive the measurement report from the control module 36, which is then transmitted from the UHF transceiver system 37 to the control module 14 via the UHF transceiver system 21. The measurement report contains, for example, a received signal strength indicator for each signal of the predetermined number of signals that was received by the key fob 12 that indicates the determined power strength of that received signal and an identification of the key fob 12. From the measurement report provided to the control module 14, the key fob 12 communicates with the control module 14 such that the control module 14 may perform any given key operation, as described above.

The positioning module 41 is configured to obtain location coordinates (longitudinal and latitudinal coordinates) of the key fob 12 such as via a global position system. The positioning module 41 sends these location coordinates to the control module 36 of the key fob 12, which are included in the measurement report that is transmitted to the control module 14 of the vehicle 11. The global navigational satellite system can be the Global Position System (GPS), the Galileo Position System, the Beidou Navigation Satellite System (BDS) or the Global Navigation Satellite System (GLONASS), for example. The control module 14 is configured to calculate a distance the key fob 12 is located relative to the vehicle 11 based on the location coordinates of the vehicle 11 and the key fob 12, respectively.

The timing module 38 is configured with a specified scanning time (e.g., 3 milliseconds) for the key fob 12 to receive the predetermined number of signals transmitted from the at least one antenna 20. That is, once the LF transceiver system 35 of the key fob 12 receives a first signal of the predetermined number of signals, the scanning time begins and the key fob 12 scans for additional signals of the predetermined number of signals. Once the scanning time expires, the key fob 12 measures with the RSSI the signal strength for each of the predetermined number of signals received by the key fob during the scanning time and generates the measurement report. That is, the key fob 12 is configured to utilize the predetermined number of signals transmitted from the at least one LF antenna 20 that are received by the key fob 12 during the specified scanning time in generating the measurement report.

With reference to FIG. 3, a flowchart 200 showing an example implementation of a routine for preventing relay attack in the passive entry system 13 of vehicle 11 is shown, which is illustratively implemented in control module 14 in vehicle 11 and control module 36 in key fob 12. The routine begins at 204 when the vehicle 11 undergoes a key trigger event.

At 208, in response to the key trigger event, the control module 14 communicates with the at least one LF antenna 20 to transmit the predetermined number of signals. As described above, each signal of the predetermined number of signals transmitted by the at least one LF antenna 20 has a different power strength.

At 212, the key fob 12 transmits the measurement report to the control module 14. The measurement report contains, for example, each signal of the predetermined number of signals that was received by the key fob 12 during the scanning time, the received signal strength indicator of each signal of the predetermined number of signals that was received by the key fob 12 and the identification of the key fob 12.

At 216, the control module 14 analyzes the measurement report to determine a) whether the measurement report contains received signal strength indicators for at least half of the predetermined number of signals transmitted from the at least one antenna 20-1, 20-2, 20-3, 20-4, 20-5 of the vehicle 11, b) whether the received signal strength indicator for each signal of the predetermined number of signals contained in the measurement report correlates to the power strength as transmitted by the at least one antenna 20-1, 20-2, 20-3, 20-4, 20-5 of the vehicle 11 to the key fob 12, and c) whether the key fob 12 is located inside or outside of the vehicle 11. If a) and b) are satisfied, the control module 14 proceeds to 220; otherwise, the control module 14 proceeds to 224 and does not perform any key operation.

At 220, the control module 14 performs the key operation of unlocking the vehicle 11 if it is determined that a) and b) are satisfied and the key fob 12 is located outside of the vehicle 11 and within a predefined exterior zone of the vehicle 11. The predefined exterior zone is a distance (e.g., 5 meters) extending away from an outer body 40 of the vehicle 11. The control module 14 performs the key operation of starting the vehicle 11 if it is determined that a) and b) are satisfied and the key fob 12 is located inside of the vehicle 11 and within a predefined interior zone of the vehicle 11. The predefined interior zone is a distance extending between a center 42 of the vehicle 11, for example, and the outer body 40 of the vehicle 11. The control module 14 then proceeds to 228 and ends.

Figure 4:
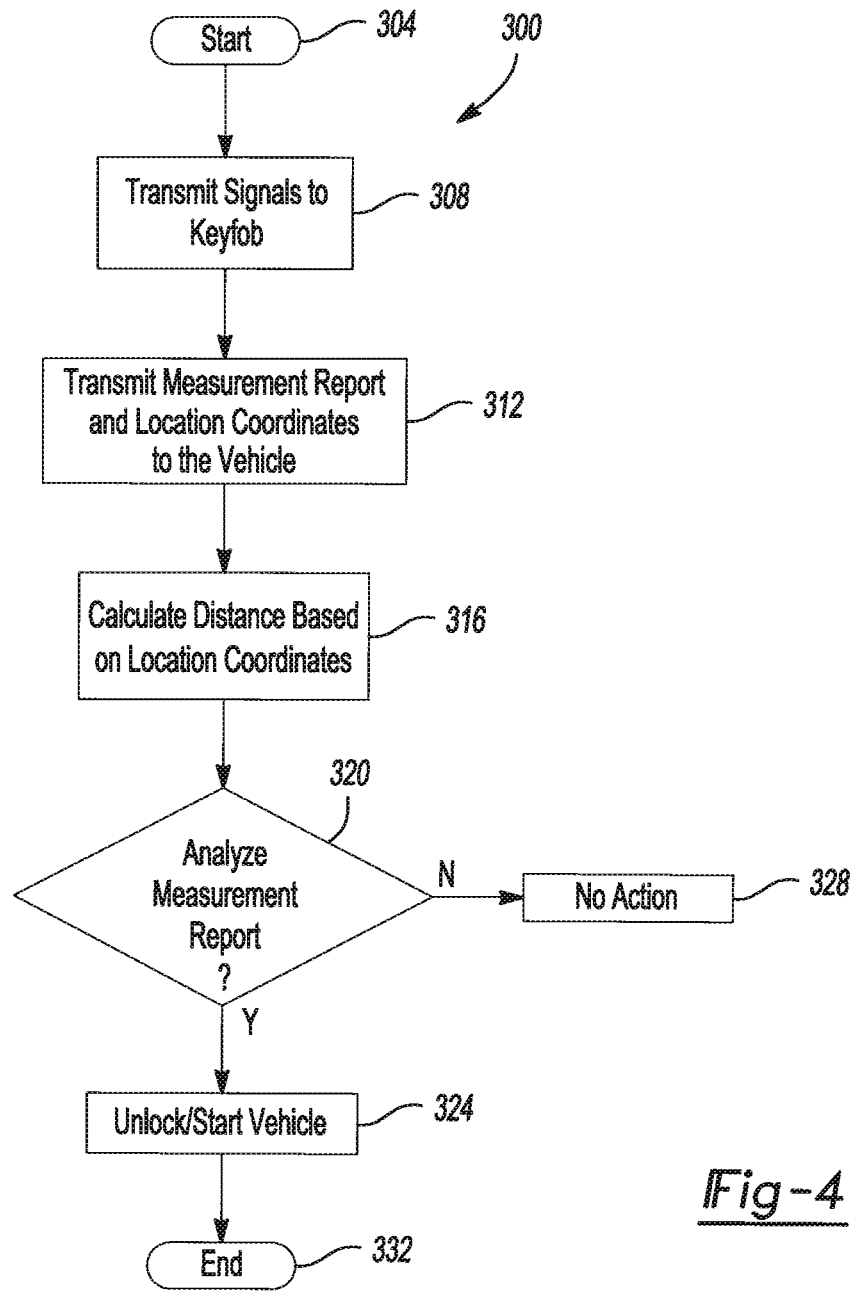
FIG. 4 is a flowchart of another control sequence of the system of FIG. 1.

With reference to FIG. 4, a flowchart 300 showing another example implementation of a routine for preventing relay attack in the passive entry system 13 of vehicle 11 is shown. The routine begins at 304 when the vehicle 11 undergoes a key trigger event.

At 308, in response to the vehicle trigger event, the control module 14 communicates with the at least one antenna 20-1, 20-2, 20-3, 20-4, 20-5 to transmit the predetermined number of signals to the LF transceiver system 35 of the key fob 12. As described above, each signal of the predetermined number of signals of the at least one antenna 20-1, 20-2, 20-3, 20-4, 20-5 has a different power strength, which is measured using the RSSI.

At 312, the key fob 12 transmits the measurement report and the location coordinates of the key fob 12 to the control module 14 of the vehicle 11. The measurement report contains, for example, each signal of the predetermined number of signals that was received by the key fob 12 during the scanning time, the power strength of each signal of the predetermined number of signals that was received by the key fob 12, the identification of the key fob 12 and the location coordinates of the key fob 12.

At 316, the control module 14 calculates the distance the key fob 12 is located relative to the vehicle 11 based on the location coordinates of the vehicle 11 and the key fob 12, respectively.

At 320, the control module 14 analyzes the measurement report to determine a) whether the measurement report contains received signal strength indicators for at least half of the predetermined number of signals transmitted from the at least one antenna 20-1, 20-2, 20-3, 20-4, 20-5 of the vehicle 11, b) whether the received signal strength indicator for each signal of the predetermined number of signals contained in the measurement report correlates to the power strength as transmitted by the at least one antenna 20-1, 20-2, 20-3, 20-4, 20-5 of the vehicle 11 to the key fob 12, and c) whether the key fob 12 is located inside or outside of the vehicle 11. The control module 14 also analyzes the distance calculated of the key fob 12 relative to the vehicle 11 based on the vehicle 11 and the key fob 12 location coordinates.

If a) and b) are satisfied, the control module 14 proceeds to 324; otherwise, the control module 14 proceeds to 328 and does not perform any key operation.

At 324, the control module 14 performs the key operation of unlocking the vehicle 11 if it is determined that a) and b) are satisfied, the key fob 12 is located outside of the vehicle 11 based on the measurement report and within a predefined exterior zone of the vehicle 11, and the key fob 12 is located outside of the vehicle 11 based on the distance calculated using the location coordinates of the vehicle 11 and the key fob 12, respectively, and within the predefined exterior zone of the vehicle 11. As discussed above, the predefined exterior zone is a distance (e.g., 5 meters) extending away from the outer body 40 of the vehicle 11. The control module 14 performs the key operation of starting the vehicle 11 if it is determined that a) and b) are satisfied, the key fob 12 is located inside of the vehicle 11 based on the measurement report and within the predefined interior zone of the vehicle 11, and the key fob 12 is located inside of the vehicle 11 based on the distance calculated using the location coordinates of the vehicle 11 and the key fob 12, respectively, and within the predefined interior zone of the vehicle 11. As discussed above, the predefined interior zone is a distance extending between the center 42 of the vehicle 11, for example, and the outer body 40 of the vehicle 11. The control module 14 then proceeds to 332 and ends.

It should be understood that the system 10 described above is not limited to preventing relay attacks on passive entry vehicles, and therefore, can be adapted to prevent relay attacks on any system susceptible to relay attacks such as home security systems and commercial building badge access systems, for example.

Control module 14 of vehicle 11 and control module 36 of key fob 12 in which any of the above relay attack prevention routines are cooperatively implemented are or include any of a digital processor (DSP), microprocessor, microcontroller, or other programmable device which are programmed with software implementing the above described methods. It should be understood that alternatively they include other logic devices, such as a Field Programmable Gate Array (FPGA), a complex programmable logic device (CPLD), or application specific integrated circuit (ASIC). When it is stated that the control module 14 or control module 36 or any of the routines implemented therein perform a function or are configured to perform a function, it should be understood that the control module 14 or control module 36 are configured to do so with appropriate logic (such as in software, logic devices, or a combination thereof).

What is claimed is:

1. A passive entry system of a vehicle having relay attack prevention, comprising:
    a control module disposed in the vehicle;
    the vehicle having at least one antenna communicating with the control module to transmit a predetermined number of signals upon occurrence of a key trigger event, each signal of the predetermined number of signals having a different power strength; and
    a key fob configured to determine a power strength of each of the predetermined number of signals that the key fob receives and generate a measurement report having a received signal strength indicator for each received signal that indicates the determined strength of that received signal and transmit the measurement report to the control module,
    the control module configured to determine whether the measurement report contains received signal strength indicators for at least half of the predetermined number of signals transmitted from the at least one antenna and whether the received signal strength indicator for each signal of the predetermined number of signals contained in the measurement report correlates to the power strength of that signal as transmitted by the at least one antenna; and
    the control module configured to perform a key operation upon determining that the received measurement report contains received signal strength indicators for at least half of the predetermined number of signals transmitted from the at least one antenna and that the received signal strength indicator for each signal contained in the measurement report correlates to the power strength of that signal as transmitted by the at least one antenna.

2. The passive entry of claim 1, wherein the power strength of each signal of the predetermined number of signals is a fraction of a predefined constant.

3. The passive entry system of claim 2, wherein the key fob is configured to utilize each of the signals of the predetermined number of signals transmitted from the at least one antenna that are received by the key fob within a specified scanning time in generating the measurement report.

4. The passive entry system of claim 3, wherein the control module determines whether the key fob is located outside of the vehicle and within a predefined exterior zone or inside the vehicle and within a predefined interior zone, and upon determining that the key fob is outside the vehicle and within the predefined exterior zone, the control module configured to perform the key operation by unlocking a door of the vehicle and upon determining that the key fob is inside the vehicle and within the predefined interior zone, the control module configured to perform the key operation by starting the vehicle.

5. The passive entry system of claim 3, wherein key fob location coordinates are transmitted to the control module, and wherein the control module calculates a distance the key fob is relative to the vehicle using the key fob location coordinates and vehicle location coordinates.

6. The passive entry system of claim 5, wherein the control module determines whether the key fob is located outside of the vehicle and within a predefined exterior zone based on the measurement report and the distance calculated using the vehicle and the key fob location coordinates, and upon determining that the key fob is outside the vehicle and within the predefined exterior zone based on the measurement report and the distance calculated using the vehicle and the key fob location coordinates, the control module is configured to perform the key operation by unlocking a door of the vehicle.

7. The passive entry system of claim 5, wherein the control module determines whether the key fob is located inside of the vehicle and within a predefined interior zone based on the measurement report and the distance calculated using the vehicle and the key fob location coordinates, and upon determining that the key fob is inside the vehicle and within the predefined interior zone based on the measurement report and the distance calculated using the vehicle and the key fob location coordinates, the control module is configured to perform the key operation by starting the vehicle.

8. The passive entry system of claim 1, wherein the control module is configured to arbitrarily transmit via the at least one antenna the predetermined number of signals.

9. A method of preventing a relay attack against a passive entry system of a vehicle, the method comprising:
    transmitting a predetermined number of signals from the vehicle upon occurrence of a key trigger event, each signal of the predetermined number of signals transmitted from at least one antenna having a different power strength;
    determining with a key fob a power strength of each signal of the predetermined number of signals that the key fob receives from the at least one antenna of the vehicle;
    generating with the key fob a measurement report having a received signal strength indicator for each received signal that indicates the determined strength of that received signal;
    transmitting with the key fob the measurement report to a control module of the vehicle;
    determining at the control module whether the received measurement report contains received signal strength indicators for at least half of the predetermined number of signals transmitted from the at least one antenna and whether the received signal strength indicator for each signal of the predetermined number of signals contained in the measurement report correlates to the power strength of that signal as transmitted by the at least one antenna; and
    having the control module perform a key operation upon determining that the received measurement report contains received signal strength indicators for at least half of the predetermined number of signals transmitted from the at least one antenna and that the received signal strength indicator for each signal contained in the measurement report correlates to the power strength of that signal as transmitted by the at least one antenna.

10. The method of claim 9, wherein the power strength of each signal of the predetermined number of signals is a fraction of a predefined constant.

11. The method of claim 10, further generating the measurement report with the key fob by utilizing each signal of the predetermined number of signals transmitted from the at least one antenna that are received by the key fob within a specified scanning time.

12. The method of claim 11, further comprising determining with the control module whether the key fob is located outside of the vehicle and within a predefined exterior zone or inside of the vehicle and within a predefined interior zone, and upon determining that the key fob is located outside the vehicle, performing the key operation of unlocking a door of the vehicle and upon determining that the key fob is located inside the vehicle, performing the key operation of starting the vehicle.

13. The method of claim 11, further comprising transmitting, from the key fob, location coordinates to the control module and calculating with the control module a distance the key fob is relative to the vehicle using the key fob location coordinates and vehicle location coordinates.

14. The method of claim 13, further comprising determining with the control module whether the key fob is located outside of the vehicle and within a predefined exterior zone based on the measurement report and the distance calculated using the vehicle and the key fob location coordinates, and upon determining that the key fob is outside the vehicle and within the predefined exterior zone based on the measurement report and the distance calculated using the vehicle and the key fob location coordinates, performing the key operation by unlocking a door of the vehicle.

15. The method of claim 13, further comprising determining with the control module whether the key fob is located inside of the vehicle and within a predefined interior zone based on the measurement report and the distance calculated using the vehicle and the key fob location coordinates, and upon determining that the key fob is inside the vehicle and within the predefined interior zone based on the measurement report and the distance calculated using the vehicle and the key fob location coordinates, performing the key operation by starting the vehicle.

* * * * *